US011590858B2

(12) United States Patent
Liao et al.

(10) Patent No.: US 11,590,858 B2
(45) Date of Patent: Feb. 28, 2023

(54) SYSTEMS AND METHODS FOR MANAGING INFORMATION IN VEHICLES

(71) Applicant: Gogoro Inc., Hong Kong (CN)

(72) Inventors: En-Yi Liao, Taipei (TW); Bo-Yu Chu, Taipei (TW); Chien-Chung Chen, Taoyuan (TW)

(73) Assignee: Gogoro Inc., Hong Kong (CN)

( * ) Notice: Subject to any disclaimer, the term of this patent is extended or adjusted under 35 U.S.C. 154(b) by 457 days.

(21) Appl. No.: 16/394,839

(22) Filed: Apr. 25, 2019

(65) Prior Publication Data
US 2020/0339005 A1 Oct. 29, 2020

(51) Int. Cl.
B60L 53/80 (2019.01)
B60L 53/66 (2019.01)
B60L 53/65 (2019.01)

(52) U.S. Cl.
CPC .............. B60L 53/80 (2019.02); B60L 53/65 (2019.02); B60L 53/66 (2019.02)

(58) Field of Classification Search
CPC ........... B60L 53/80; B60L 53/66; B60L 53/65
See application file for complete search history.

(56) References Cited

U.S. PATENT DOCUMENTS

| 9,139,310 | B1* | 9/2015 | Wang | B60L 53/14 |
| 9,331,503 | B2* | 5/2016 | Yonetani | H02J 7/005 |
| 2014/0266006 | A1* | 9/2014 | Luke | B60L 58/12 |
| | | | | 320/106 |
| 2015/0042285 | A1* | 2/2015 | Doerndorfer | H01M 10/425 |
| | | | | 320/127 |
| 2015/0149015 | A1* | 5/2015 | Nakano | B60L 58/12 |
| | | | | 701/22 |
| 2016/0039300 | A1* | 2/2016 | Wang | B64C 39/024 |
| | | | | 244/58 |
| 2017/0053459 | A9* | 2/2017 | Luke | B60L 53/67 |
| 2017/0140349 | A1* | 5/2017 | Ricci | B60L 53/35 |
| 2017/0140603 | A1* | 5/2017 | Ricci | B60L 53/12 |
| 2017/0158070 | A1* | 6/2017 | Salasoo | H01M 10/4207 |
| 2018/0312069 | A1* | 11/2018 | McClymond | B64F 1/36 |
| 2019/0202415 | A1* | 7/2019 | Lai | G06Q 30/0206 |
| 2019/0202416 | A1* | 7/2019 | Lai | B60L 53/305 |
| 2019/0207267 | A1* | 7/2019 | Vickery | B60L 53/66 |

(Continued)

FOREIGN PATENT DOCUMENTS

| CN | 105210108 A | 12/2015 |
| CN | 105956743 A | 9/2016 |
| TW | I430904 B | 3/2014 |

OTHER PUBLICATIONS

Taiwanese Office Action received for co-pending Taiwanese Patent Application No. TW108142203; Applicant; Gogoro Inc.; dated Nov. 16, 2020, 13 pages.

(Continued)

Primary Examiner — Peter D Nolan
Assistant Examiner — Wae L Louie
(74) Attorney, Agent, or Firm — Perkins Coie LLP

(57) ABSTRACT

The present disclosure relates to methods and associated systems for operating a battery exchange station. The present method includes (1) receiving a ratio associated with a plurality of vehicles served by the battery exchange station; and (2) based on the ratio, storing different sets of information in memories associated with the batteries respectively, in accordance with received ratio.

19 Claims, 14 Drawing Sheets

(56) References Cited

U.S. PATENT DOCUMENTS

2019/0207397 A1* 7/2019 Lai .................. B60L 53/80
2019/0207398 A1* 7/2019 Shih ................ H02J 7/0071
2020/0016984 A1* 1/2020 Mantea ............ H01M 50/20
2020/0339005 A1* 10/2020 Liao ............... H02J 7/00036

OTHER PUBLICATIONS

European Search Report received for co-pending European Patent Application No. EP19218646.8; Applicant; Gogoro Inc.; dated Jul. 27, 2020, 4 pages.
Chinese Office Action issued for CN Application No. 202010225763. 1, Applicant: Gogoro Inc., dated Jun. 2, 2021, 9 pages.

* cited by examiner

SYSTEMS AND METHODS FOR MANAGING INFORMATION IN VEHICLES

TECHNICAL FIELD

The present technology is directed to systems and methods for managing information or contents in a vehicle. More particularly, the present technology is directed to systems and methods for providing information (e.g., distributing firmware/software updates) to a plurality of vehicles that are powered by exchangeable batteries.

BACKGROUND

Efficiently managing information in multiple vehicles can be challenging. For example, different vehicles require different types/versions of information for their operation. For example, vehicles made by different manufacturers may need different firmware to operate. Also, even vehicles made by the same manufacturer may need different versions of firmware to operate. Traditionally, information in a vehicle can be updated or managed when the vehicle is brought to a service center, which can be time-consuming and inconvenient. Therefore, it is advantageous to have improved systems and methods to address these issues.

BRIEF DESCRIPTION OF THE DRAWINGS

Embodiments of the disclosed technology will be described and explained through the use of the accompanying drawings.

Figure 1A:
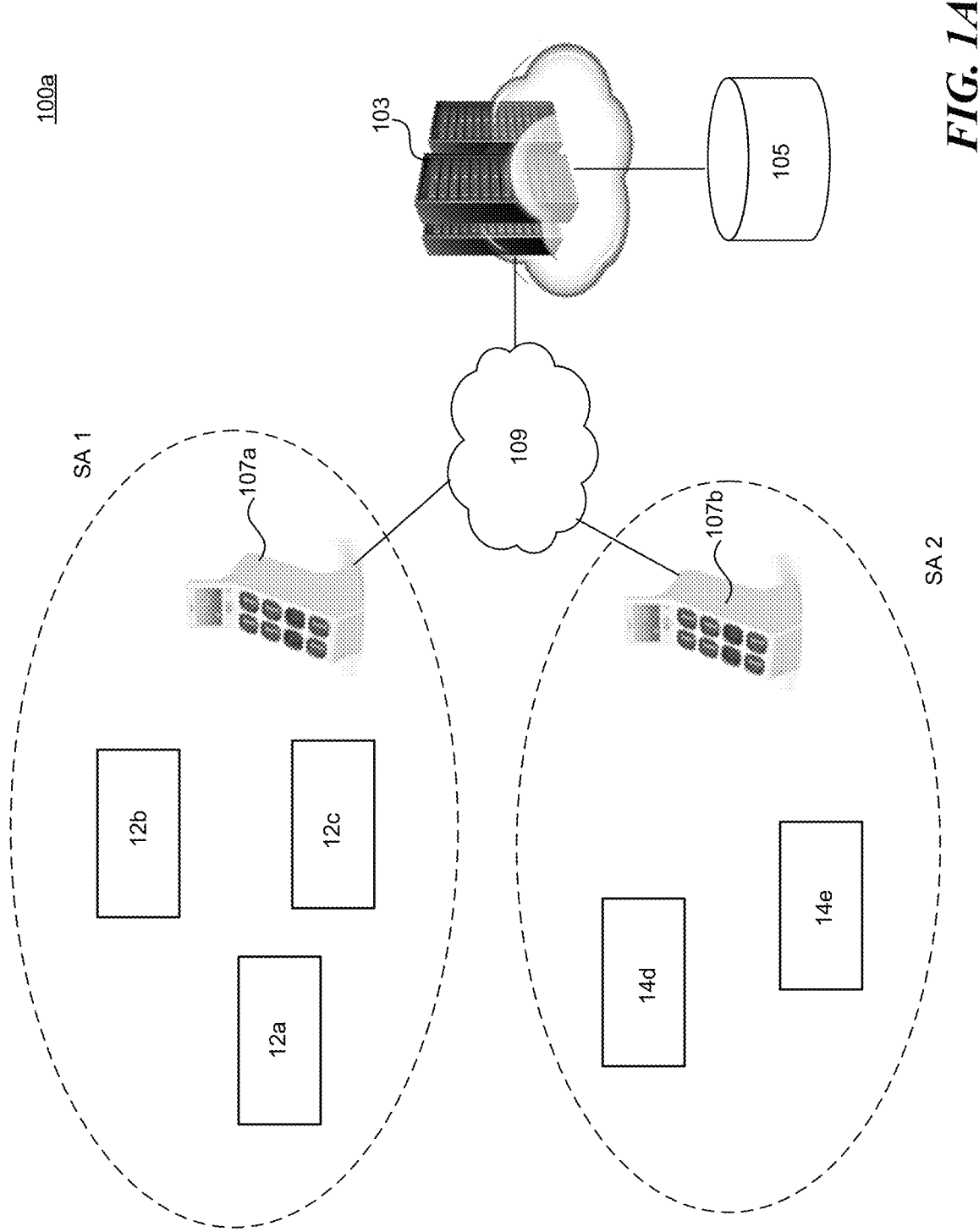
FIG. 1A is a diagram illustrating a system in accordance with embodiments of the disclosed technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiments," "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The disclosed systems can manage information in (or distribute information to) multiple vehicles that are powered by exchangeable batteries. More particularly, the disclosed system can store information to be provided to various types of vehicles in memories attached to multiple exchangeable batteries in a battery station. These batteries are prepared based on a ratio associated with the vehicles (e.g., types of vehicles). When preparing batteries at the battery station, the information to be provided to the vehicles is stored in individual memories attached to individual batteries based on the foregoing ratio. For example, if the ratio is "2:3," then the battery station will prepare its batteries by storing information in two sets of batteries based on the "2:3" ratio. Through battery exchanges at the battery station, the stored information can be effectively and efficiently provided to the vehicles served by the battery station. It is especially beneficial in embodiments where there is only limited storage space to store information to be provided (e.g., a memory attached to a battery may only have a limited storage space such that it can only store part of the information to be provided, such as only one type of firmware update package).

One aspect of the present technology is to provide firmware updates to vehicles based on a ratio associated with the types of vehicles. In some embodiments, assume that there are three types of vehicles A, B, and C that are operated in an area (e.g., geographical, administrative, etc.) where the battery station is located. A (vehicle-number) ratio of vehicles A, B, and C is around "3:2:1." For example, there are around 300 vehicles A, 200 vehicles B, and 100 vehicles C operating in the area. Vehicles A currently have firmware FA, vehicles B currently have firmware FB, and vehicles C currently have firmware FC. Assume that firmware FA and FB needs to be updated. To efficiently (e.g., as soon as possible or sooner than conventional approaches) deploy updated firmware FA, FB to vehicles A and B, respectively, the battery station can prepare the batteries therein in accordance with the (vehicle number) ratio.

For example, the battery station can store updated firmware FA, FB in the memories attached to the batteries based on the (vehicle number) ratio. More particularly, if the battery station has 10 batteries available for exchange at one time, then the battery station can store updated firmware FA in six batteries and firmware FB in four batteries (based on the "3:2" ratio of vehicle A and B). When a user of vehicle A or B goes to the battery station to exchange a battery, the station can first determine the type of vehicle and then provide a corresponding battery (e.g., a battery with updated firmware FA to vehicle A; a battery with updated firmware FB to vehicle B) to the user, if available. The station can determine the type of the vehicle based at least partially on (1) information in a user profile (which can be stored in a server communicably coupled to the station); (2) information stored in a battery memory attached to the battery that was used to power the vehicle; and/or (3) information stored in a user device (e.g., a user's smartphone, wearable devices, etc.). In some embodiments, the battery memory attached to the battery can communicate with and be controlled by a battery processor. In some embodiments, the battery processor can be coupled to the battery memory via a wired or wireless connection. In some embodiments, the battery processor and the battery memory can be integrated in one battery control module. In some embodiments, the battery control module (or the battery processor) can communicate with the battery station (e.g., via a battery slot module of the battery station) via Near-Field Communication (NFC).

In this illustrated embodiment, when a user of vehicle A goes to the battery station to exchange a battery, the station can (1) determine the type of vehicle; and (2) provide a corresponding battery (e.g., one with updated firmware FA) to the user. Similarly, when another user of vehicle B goes to the battery station to exchange a battery, the station can determine the vehicle and provide a battery with updated firmware FB. By this arrangement, users do not have to wait for their battery (or batteries) to be prepared (e.g., wait for the station to store suitable firmware in the memory attached to the battery), and the station can server the users in a fast, grab-and-go fashion.

In some embodiments, when a user of vehicle C goes to the battery station to exchange a battery, the station can (1) determine the type of vehicle; (2) determine a current battery ratio based on information to be provided (e.g., batteries currently having updated firmware FA in their memories verses ones currently having updated firmware FB in their memories); and (3) provide a corresponding battery to the user so as to keep the current battery ratio to a target battery ratio (e.g., the vehicle ratio "3:2" ratio of vehicle A and B) as close as possible. For example, when there are five batteries with firmware FA and five batteries with firmware FB in station, the station will provide a battery with firmware FB to the user of vehicle C. By this arrangement, the station can maintain the current battery ratio as close to the target battery ratio as possible, such that the station can readily serve users with all types of vehicles.

Another aspect of the present technology is to provide information to vehicles based on a ratio associated with the types of information/content to be provided to vehicles. In some embodiments, firmware for the same type of vehicles can have various versions. For example, assume that there are two types of vehicles A and B operating generally in the area where the battery station is located. Vehicles A currently have two versions of firmware FA1, FA2, and vehicles B currently have three versions of firmware FB1, FB2, FB3. In embodiments where different versions of firmware require different update packages (e.g., firmware FA1 and firmware FA2 require different update packages to upgrade to firmware FA3; firmware FB1, firmware FB2, and firmware FB3 require different update packages to upgrade to firmware FB4), a (vehicle-content) ratio of vehicles A, B with different firmware versions can be considered and the battery station can prepare the batteries therein in accordance with the vehicle-content ratio.

For example, the (vehicle-content) ratio of "vehicle A with firmware FA1," "vehicle A with firmware FA2," "vehicle B with firmware FB1," "vehicle B with firmware FB2," and "vehicle B with firmware FB3" can be "1:2:1:3:1." Assume that the battery station has 8 batteries available for exchange at one time (and assume that the memory of a battery can only store one update package at one time). The battery station can store an update package for firmware FA1 in 1 battery, update packages for firmware FA2 in two batteries, an update package for firmware FB1 in 1 battery, update packages for firmware FB2 in three batteries, and an update package for firmware FB3 in 1 battery (based on the foregoing "1:2:1:3:1" ratio).

In the following description, for the purposes of explanation, numerous specific details are set forth in order to provide a thorough understanding of embodiments of the present technology. It will be apparent, however, that embodiments of the present technology may be practiced without some of these specific details.

FIG. 1A is a schematic diagram illustrating a system 100a in accordance with embodiments of the disclosed technology. The system 100a is configured to manage multiple exchangeable batteries (e.g., store/provide information/content to memories attached thereto) positioned in a plurality of battery exchange stations. The system 100a is configured to provide various types of information (e.g., firmware, parameters, updates, advertisement, suitable data for operating a vehicle, contents (such as music, ring tones, themes, etc.) for a user operating the vehicle, etc.) to multiple corresponding vehicles via memories attached to exchangeable batteries through battery exchange.

To improve the efficiency of providing various types of information, the system 100a first determines a ratio associated with the multiple corresponding vehicles and then individually stores different types of information to be provided in different memories of batteries. The ratio can be determined based on, for example, information collected/stored/analyzed by the system 100a (e.g., historical data such as, user profiles, subscription plans, vehicle data, data collected via batteries associated with the system 100a, etc.). In some embodiments, such information can be collected/stored/analyzed by a battery exchange station or a server.

The term "area" or "service area" used herein refers to the area that is covered by the service of a station battery exchange station. Each station can have different service areas. For example, station A can have a service area with a 10-kilometer radius. As another example, station B can have another service area with a 20-kilometer radius. In some embodiments, the service areas can overlap.

As shown in FIG. 1, the system 100a includes a server 103, a database 105 coupled to the server 103, and multiple battery exchange stations 107 (only first and second stations 107a, 107b are shown in FIG. 1A). The first station 107a provides battery exchange services to users/vehicles in Service Area 1, and the second station 107b provides battery exchange services to users/vehicles in Service Area 2. In some embodiments, Service Areas 1, 2 can be administrative areas such as a city, a county, district, etc. In some embodiments, Service Areas 1, 2 can be geographic areas such as an area adjacent to a point of interest (a stadium, city hall, university, shopping mall, facility, etc.), a recreational area, etc.

The first station 107a provides services to vehicles 12 in Service Area 1, and the second station 107b provides services to vehicles 14 in Service Area 2. As shown, vehicles 12 in Service Area 1 include three types of vehicles 12a, 12b, and 12c. A ratio of the numbers of vehicles 12a, 12b, and 12c is "Na:Nb:Nc." Similarly, vehicles 14 in Service Area 2 include two types of vehicles 14d, 14e. A ratio of the numbers of vehicles 14d, 14e is "Nd:Ne."

When the system 100a is instructed to deploy vehicle-type-specific information (e.g., updates, contents, etc.) to the vehicles 12 in Area 1, the first station 107a can prepare the batteries therein based on the ratio "Na:Nb:Nc." Similarly, when the system 100a is instructed to deploy vehicle-type-specific information to the vehicles 14 in Service Area 2, the second station 107b can prepare the batteries therein based on the ratio "Nd:Ne." In the illustrated embodiments, the ratio is calculated based on the numbers of vehicles in the area. In some embodiments, the ratio can be determined based on other factors such as vehicle-component types (e.g., the system 100a can determine that vehicles having a processor manufactured by company M1 needs a first set of operational parameter, and a processor manufactured by company M2 needs a second set of operational parameter), types of content to be provided (e.g., different firmware or operational parameter sets for high performance users and economic users), versions of information to be provided, etc.

The disclosed systems can manage information in (or distribute information to) multiple vehicles that are powered by exchangeable batteries. More particularly, the disclosed system can store information to be provided to various types of vehicles in memories attached to multiple exchangeable batteries in a battery station. These batteries are prepared based on a ratio associated with the vehicles (e.g., types of vehicles).

In some embodiment, the ratio can also be determined based on other suitable factors, such as types of content to be provided (e.g., firmware versions, operating parameters, vehicle themes selected by users, contents that can be displayed (e.g., images) or played (e.g., audio files) by the vehicles), user profiles (e.g., user subscription plans, routes, riding/driving histories, etc.). For example, the system can determine that there are 1000 vehicles operated by users who subscribe a high-performance battery plan (which enables users to exchange newer batteries or batteries with higher state of charges, SoCs, for example) and the system wants to send a first set of operational parameters to these users such that they can operate their vehicles more efficiently. The system can also determine that there are 2000 vehicles operated by users who subscribe an economic battery plan (which enables users to exchange older batteries or batteries with lower SoCs, for example) and the system wants to send a second set of operational parameters to these users such that they can operate their vehicles more efficiently. In this embodiment, the ratio can be "1000:2000," which is determined based on the type of information to be provided (i.e., first and second sets of operational parameters).

In some embodiments, assume that the server 103 receives an instruction from a system operator that firmware for vehicles 12a, 12b, 12c, 14d, and 14e needs to be updated. Each type of vehicles 12a, 12b, 12c, 14d, and 14e requires different firmware update packages. In this example, to efficiently deploy updated firmware to vehicles 12a, 12b, 12c, 14d, and 14e, the system 100a can (1) prepare the batteries in the first station 107a based on the ratio "Na:Nb:Nc" and (2) prepare the batteries in the second station 107b based on the ratio "Nd:Ne." In some embodiments, the system 100a can determine to deploy updated firmware to the vehicles 12a, 12b, 12c, 14d, and 14e as soon as practical. In some embodiments, the system 100a can determine to deploy updated firmware to the vehicles 12a, 12b, 12c by a first predetermined time (e.g., next week), and to the vehicles 14d, and 14e by a second predetermined time (e.g., within 48 hours). In some embodiments, the first and second predetermined time can be dynamically adjusted, e.g., by the server 103.

For example, assuming that the first station 107a can provide 18 batteries at one time and the ratio "Na:Nb:Nc" equals to "3:1:2," then the first station 107a can prepare 9 batteries for vehicles 12a (e.g., by storing updated firmware packages for vehicles 12a in these 9 batteries), prepare 3 batteries for vehicles 12b (e.g., by storing updated firmware packages for vehicles 12b in these 3 batteries), and prepare 6 batteries for vehicles 12c (e.g., by storing updated firmware packages for vehicles 12c in these 6 batteries). By this arrangement, the system 100a can provide firmware updates to vehicles 12 operating in Service Area 1.

In a similar fashion, assuming that the second station 107b can provide 24 batteries at one time and the ratio "Nd:Ne" equals to "3:5," the second station 107b can prepare 9 batteries for vehicles 14d (e.g., by storing updated firmware packages for vehicles 14d in 9 batteries) and prepare 15 batteries for vehicles 14e (e.g., by storing updated firmware packages for vehicles 14e in 15 batteries). By this arrangement, the system 100a can provide firmware updates to vehicles 14 operating in Area 2.

In the illustrated embodiments, the system 100a can determine a first ratio for the first station 107a based on the composition of vehicles in Service Area 1. The system 100a can determine a second ratio for the second station 107b in Service Area 2. In some embodiments, the first ratio and the second ratio can be different. By customizing the ratio in each service area according to each corresponding service area, the system 100a can effectively and efficiently distribute information to suitable vehicles 12, 14.

In some embodiments, the system 100a can prepare batteries in multiple stations in Service Area 1 in the same way as it prepares the first station 107a. In addition, the system 100a can prepare batteries in multiple stations in Service Area 2 in the same way as it prepares the second station 107b. In some embodiments, the system 100a can be configured to provide information to vehicles in more than two areas in the way similar to the embodiments described herein.

In some embodiments, the information to be provided to the vehicles 12, 14 can include, firmware packages, firmware update packages, software, software update packages, information for operating, maintaining, configurating, or testing a vehicle, and/or other suitable information or contents, such as music, ring tones, themes, contents that can be displayed or played by the vehicles), information associated with user profiles (e.g., user subscription plans, routes, riding/driving histories, etc.). For example, the system 100a can provide two types of driving or riding themes (which can include various audio files and images to be played when riding an electric scooter) for high-performance plan users and economic plan users. As another example, the system 100a can provide two sets of operational parameters for users who frequently drive/ride on mountain roads (e.g., uphill and downhill roads) and for users who frequently drive/ride in a city (e.g., flat roads but with frequent stop-and-go).

As shown in FIG. 1A, the battery exchange stations 107a, 107b can communicate with the server 103 via a network 109. The server 103 is configured to provide information (e.g., information to be stored in batteries, information to be provided to vehicles, etc.) to the battery exchange stations 107a, 107b via the network 109. In some embodiments, the server 103 can store information in a battery memory coupled to an exchangeable battery placed for charging in the battery exchange stations 107a, 107b via the network 109. In some embodiments, however, such information can be stored in the battery exchange stations 107a, 107b. For example, the information can be uploaded to the battery exchange stations 107a, 107b, when the exchangeable battery is placed in the battery exchange stations 107a, 107b (e.g., via a wired or wireless connection). In some embodiments, the server 103 can provide information to a mobile device 111 (e.g., a battery user's smartphone that has an app configured to communicate with the exchangeable battery and/or the station 107a, 107b) via the battery memory through the network 109 (e.g., the mobile device 111 can be configured to read information from the battery memory when the exchangeable battery is placed in the user's vehicle).

In some embodiments, the server 103 can also be configured to collect information through the battery exchange stations 107a, 107b via the network 109. For example, the server 103 can receive information from the battery memory coupled to the exchangeable battery positioned in the battery exchange stations 107a, 107b via the network 109. In some embodiments, the server 103 can also receive information from the mobile device 111 through the battery memory via the network 109. In some embodiments, the server 103 can also receive information from the vehicles 12, 14 through the battery memory via the network 109.

The database 105 can store information associated with the present disclosure (e.g., information to be provided to batteries, information collected by the server 103, information analyzed by the server 103, information generated by the server 103, user account information, user battery plans, user histories, user behavior, user driving/riding habits, environmental conditions of the stations, event information, etc.). In some embodiments, the database 105 can be a publicly accessible database (e.g., power interruption alert/notification database, weather forecast database, travel alert database, traffic information database, location service database, map database, etc.) maintained by government or private entities. In some embodiments, the database 105 can be a private database that provides proprietary information (e.g., information of private power service provider, user accounts, user credit histories, user subscription information, etc.). In some embodiments, the database 105 can include a firmware release system configured to manage and release various types of firmware updates to be provided to the vehicles 12, 14. In some embodiments, the database 105 and the server 103 can be integrated as one device.

The network 109 can be a local area network (LAN) or a wide area network (WAN), but it can also be other wired or wireless networks. The network 109 can be the Internet or some other public or private network. The first and second stations 107a, 107b or the mobile device 111 can be connected to the network 109 through a network interface (e.g., by wired or wireless communication). The server 103 can be coupled to the database 105 via any kind of local, wide area, wired, or wireless network, including the network 109 or a separate public or private network. In some embodiments, the network 109 includes a secured network that is used by a private entity (e.g., a company, etc.).

In some embodiments, each of the first and second stations 107a, 107b is coupled to a power supply (not shown in FIG. 1A). The power supply can provide power to the first and second stations 107a, 107b for charging the exchangeable batteries positioned therein and for maintaining its other operations (e.g., displaying, communications, computation, etc.). In some embodiments, the power supply can include a public power line/grid/station, a private power line/grid/station, and/or other suitable energy storage devices/media. In some embodiments, the first and second stations 107a, 107b can be electrically coupled to two or more power supplies/sources to receive power to charge the batteries positioned therein and to perform other operations.

Figure 1B:
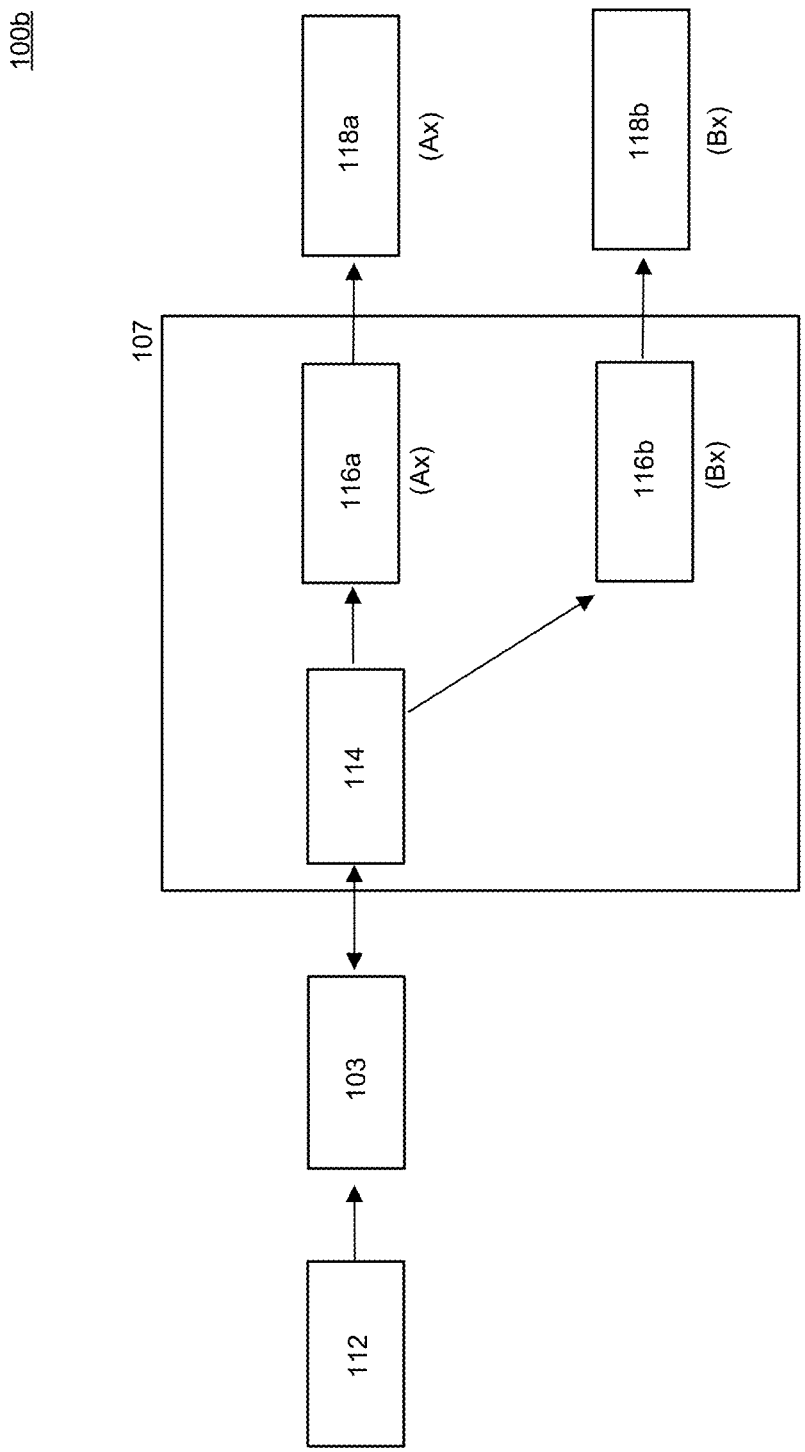
FIGS. 1B-1D are schematic diagrams illustrating systems in accordance with embodiments of the disclosed technology.
Figure 1C:
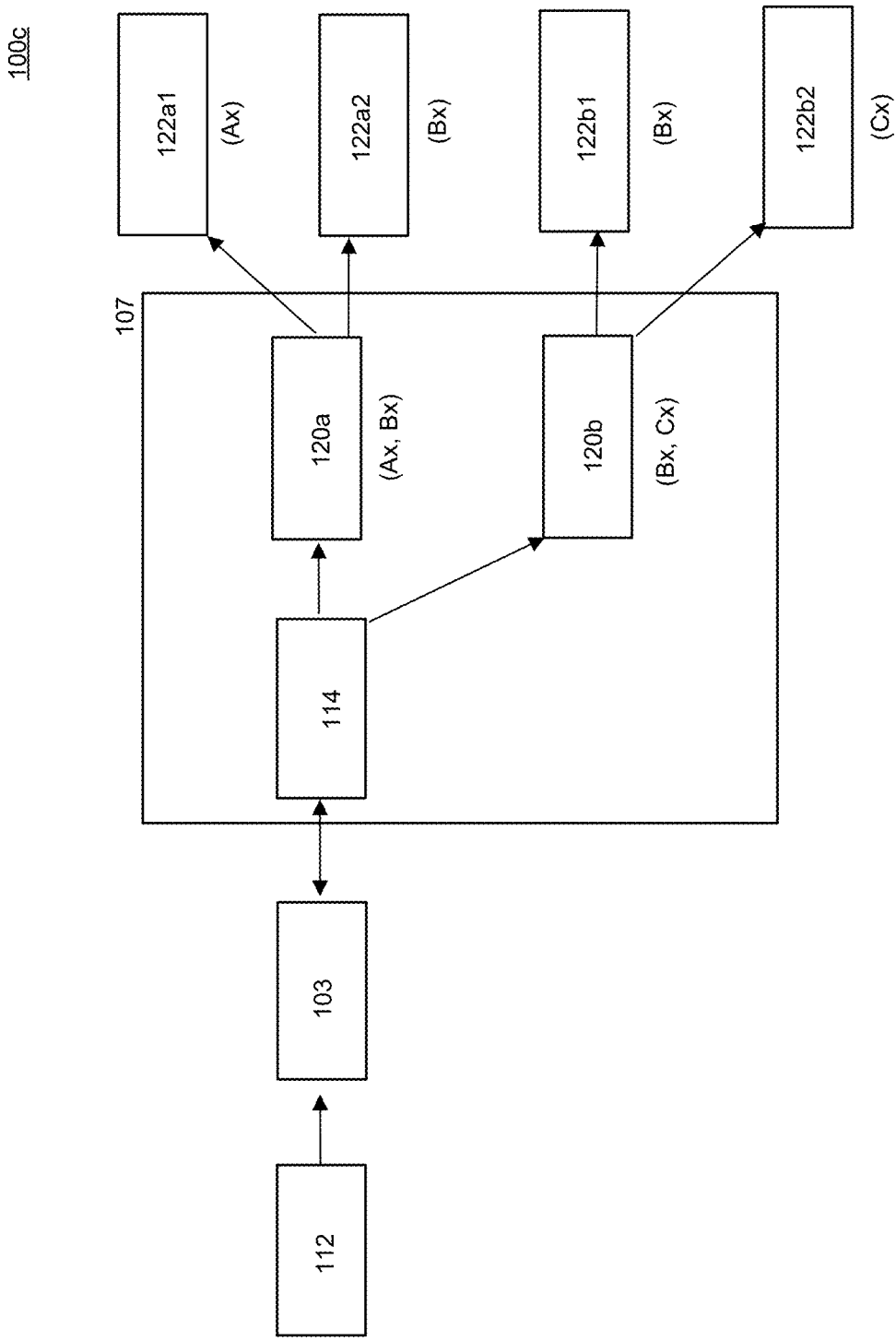
Figure 1D:
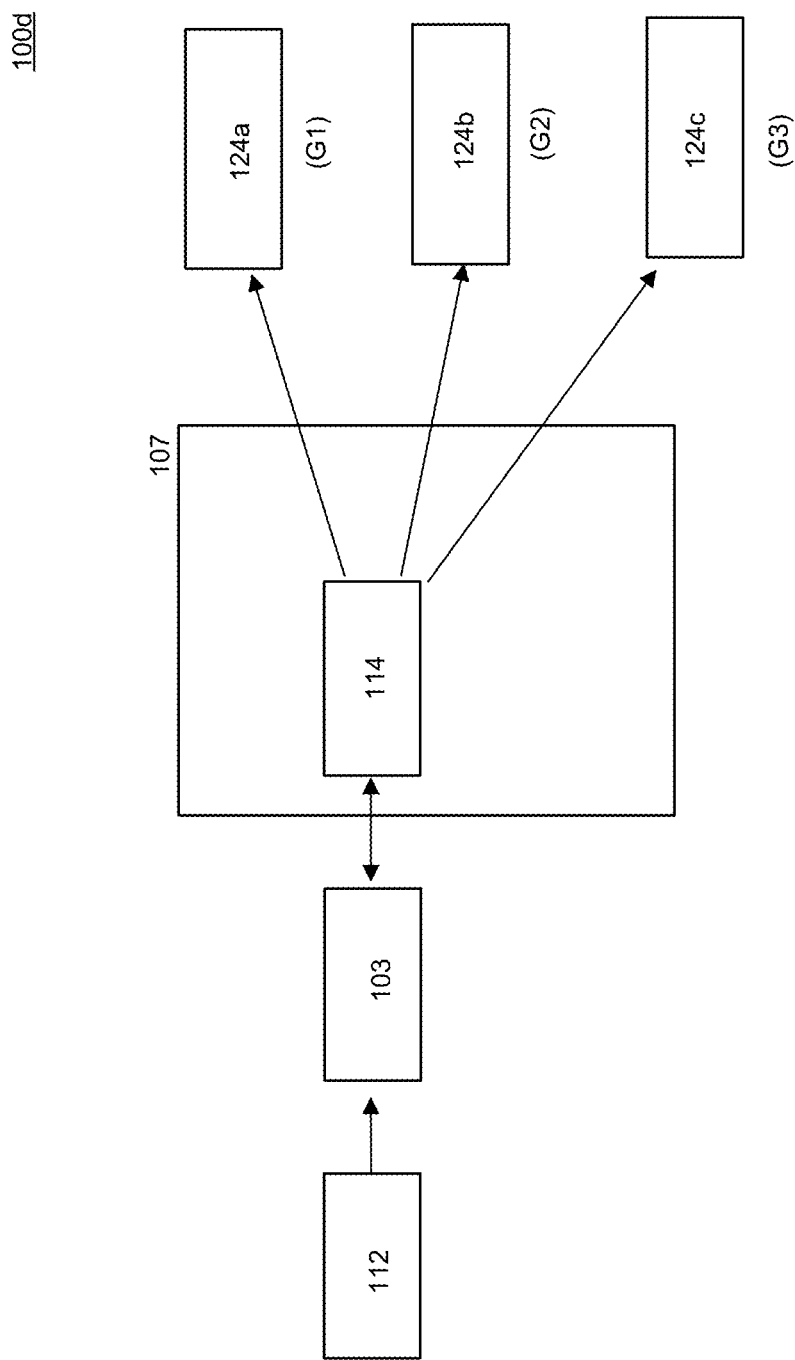

FIGS. 1B-1D are schematic diagrams illustrating systems 100b, 100c, and 100d in accordance with embodiments of the disclosed technology. More particularly, FIGS. 1B-1D illustrate how information (e.g., using firmware packages as example) is distributed from a release system 112 to a battery (e.g., in a memory attached to or in the battery).

Referring to FIG. 1B, the release system 112 can be configured to manage or generate multiple firmware packages to be distributed. The multiple firmware packages are then sent to the server 103. The server 103 can communicate with the station 107 and then determine the ratio to be used for the station 107 to prepare its battery slots 116 (e.g., only two types of battery slots 116a, 116b are shown in FIG. 1B). In the illustrated embodiments, different "types" of battery slots are configured to deploy or distribute different types of information (e.g., firmware) to the batteries positioned therein. The station 107 includes a processor/mainboard 114 configured to control the battery slots 116a, 116b and distribute the firmware packages to batteries 118 (e.g., two batteries 118a, 118b are shown in FIG. 1B). In some embodiments, each of the battery slots 116a, 116b can include a connector (or an interface) positioned therein and configured to connect or communicate with a memory associated with the batteries 118. In some embodiment, the connector can be a wired connector (e.g., to communicate with the memory via a wired communication such as a signal line). In some embodiments, the connector can be a wireless connector (e.g., to communicate with the memory via a wireless communication such as a Wi-Fi communication, a Bluetooth communication, etc.).

In the illustrated embodiments, a ratio between the number of battery slot 116a and the number of battery slot 116b can be determined based on the types of vehicles that the station 107 serves. For example, assuming that the station 107 includes 10 batteries slots 116. The station 107 serves two types of vehicles, vehicle V1 and V2. The ratio between the number of vehicle V1 and the number of vehicle V1 is "3:2." Vehicles V1 need firmware package Ax and Vehicles V2 need firmware package Bx. In this case, the station 107 can designate six battery slots 116 as "battery slot 116a" for deploying firmware package Ax, and designate four battery slots 116 as "battery slot 116b" for deploying firmware package Bx. When the battery 118a is inserted in the battery slot 116a for charging, the station 107 stores the firmware package Ax in the battery 118a. Similarly, when the battery 118b is inserted in the battery slot 116b for charging, the station 107 stores the firmware package Bx in the battery 118b. By this arrangement, the station 107 can quickly release or distribute firmware packages Ax, Bx to suitable vehicles in an efficient way.

In some embodiments, the station 107 can determine not to update firmware packages of batteries if doing so will not change the ratio. For example, in the foregoing embodiment, assume that the battery 118a already has firmware package Bx and that the battery 118b already has firmware package Ax. In this case, instead of changing the firmware package Bx in the battery 118a to firmware package Ax and changing the firmware package Ax in the battery 118b to firmware package Bx, the station 107 can decide not to change the firmware package in either battery 118a or 118b, since doing so will not change the ratio of the firmware packages in the station 107.

In some embodiments, assume that the battery slots 116a, 116b have only limited storage space (e.g., about 2 megabytes or MB) for storing the firmware packages and the batteries 118 also have only limited space to store firmware packages (e.g., 1.5 MB). Assuming that one firmware package requires about 1.5 MB storage space, then the battery slots 116a, 116b can each store only one firmware package. Therefore, the station 107 can only store firmware package Ax in the battery slot 116a, and only store firmware package Bx in the battery slot 116b, but not both.

Referring to FIG. 1C, the release system 112 can generate multiple firmware packages and distribute them to the server 103. The server 103 can communicate with the station 107 and then determine the ratio to be used for the station 107 to prepare its battery slots 120 (e.g., only two types of battery slots 120a, 120b are shown in FIG. 1C). In the illustrated embodiment, assume that the battery slots 120a, 120b have only limited storage space (e.g., about 3-5 megabytes or MB) for storing the firmware packages and the batteries 122 (e.g., four batteries 122a1, 122a2, 122b1, and 122b2 are shown in FIG. 1C) also have only limited space to store firmware packages (e.g., 1.5 MB). Assuming that a firmware package requires about 1.5 MB storage space, then the battery slots 120a, 120b can each store two (or three) firmware packages.

Accordingly, the station 107 can store firmware packages Ax and Bx in the battery slot 120a, and store firmware packages Bx and Cx in the battery slot 120b. When the battery 122a1 or 112a2 is inserted in the battery slot 120a for charging, the station 107 can store either the firmware package Ax or Bx therein. Similarly, when the battery 122b1 or 122b2 is inserted in the battery slot 120b for charging, the station 107 can store either the firmware package Bx or Cx therein. Note that there can be other batteries slots 120 in the system 100c (not shown), and the ratio of the numbers of batteries 122 having firmware packages Ax, Bx, and Cx is in accordance with the ratio determined by the server 103. By this arrangement, the system 100c can effectively distribute the multiple firmware packages.

In the embodiments illustrated in FIG. 1D, the station 107 can directly store firmware packages in batteries 124 (e.g., three batteries 124a, 124b, and 124c are shown in FIG. 1D) via the processor/mainboard 114. Assume that the batteries 124 have various storage capacities for storing firmware packages. For example, the battery 124a can store one firmware package. The batteries 124b, 124c can store multiple firmware packages. Based on the ratio, the station 107 can divide the multiple firmware packages to be provided into groups, for example, groups G1, G2, and G3. Group G1 only has one firmware package (e.g., Ax), whereas groups G2 and G3 can have multiple firmware packages (e.g., group G2 can include Bx and Cx; group G3 can include Ax and Bx). Note that there can be other batteries 124 (not shown) in the system 100d, and the ratio of the numbers of batteries 124 having firmware packages Ax, Bx, and Cx is in accordance with the ratio determined by the server 103 (e.g., the batteries with Ax can be determined by adding the numbers of batteries of groups G1 and G3; e.g., the batteries with Bx can be determined by adding the numbers of batteries of groups G2 and G3; e.g., the batteries with Cx can be determined by the number of batteries of group G2). By this arrangement, the system 100d can effectively distribute the multiple firmware packages.

In some embodiments, the ratio can be determined based on factors such as the types of vehicles that a station serves, the types of information to be distributed, and a combination thereof. For example, assume that a station can serve 4 types of vehicles (V1-V4), and the ratio of vehicle numbers of vehicles V1-V4 is "1:2:3:4." In some embodiments where there are 4 types of information to be distributed, the station can use the vehicle-number ratio of "1:2:3:4" as its ratio to prepare batteries. In some embodiments where there are 2 types of information to be distributed (e.g., for only vehicles V1 and V2), the station can (1) consider both the types of vehicles and the types of information to be distributed and (2) determine to use the vehicle-number ratio "1:2" (namely only the ratio between vehicle V1 and V2) as its ratio to prepare batteries.

Figure 2A:
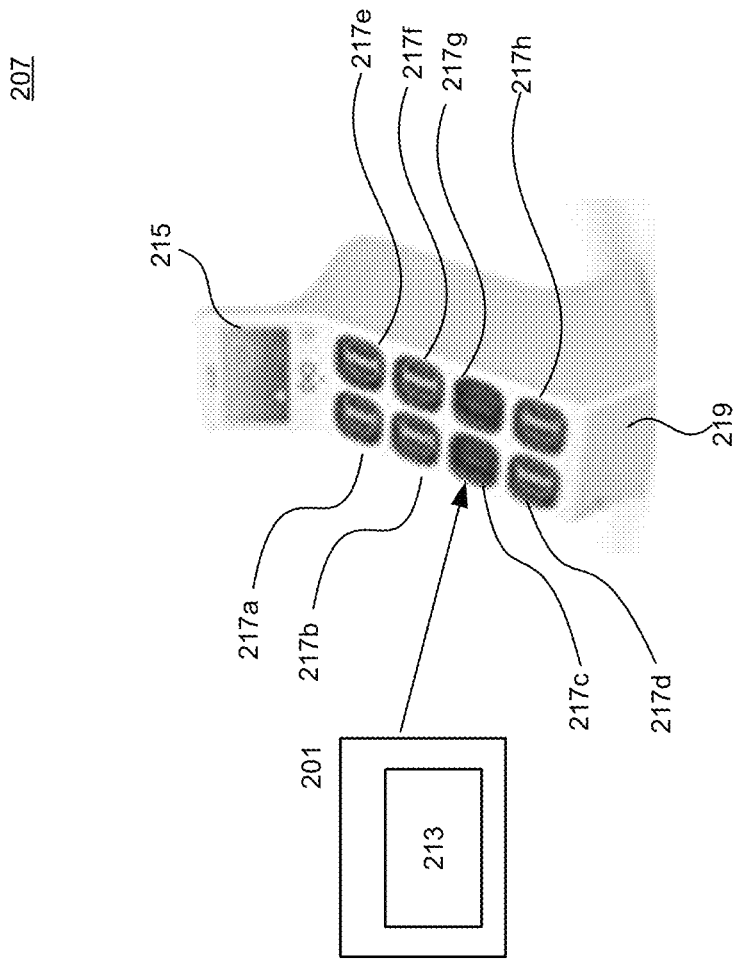
FIG. 2A is a diagram illustrating a battery exchange station in accordance with embodiments of the disclosed technology.

FIG. 2A is a schematic diagram illustrating a battery exchange station 207 in accordance with embodiments of the disclosed technology. The battery exchange station 207 can be configured to prepare batteries by charging the same and/or storing information in memories attached thereto. The battery exchange station 207 can communicate with a server, a database, a mobile device, a vehicle, and/or another battery exchange station via a network.

As shown in FIG. 2A, the battery exchange station 207 includes (i) a display 215 configured to interact with a user, and (ii) a battery rack 219 having eight battery slots 217a-h configured to accommodate batteries to be charged. In the illustrated embodiments, each of the slots 217a-h includes a bi-directional charger (e.g., capable of charging and discharging a battery) positioned therein and configured to couple to an exchangeable battery. During operation, only six battery slots (e.g., slots 217a, 217b, 217d, 217e, 217f, and 217h) are occupied by batteries, and the remaining two slots (e.g., slots 217c and 217g) are reserved for a user to insert depleted batteries. In some embodiments, the battery exchange station 207 can have different arrangements such as different numbers of racks, displays, and/or slots. In some embodiments, the battery exchange station 207 can include modular components (e.g., modular racks, modular displays, etc.) that enable an operator to conveniently install or expand the battery exchange station 207.

In some embodiments, a user can remove a battery from the battery exchange station 207, without inserting one beforehand. In some embodiments, the battery exchange station 207 can have a locking mechanism for securing the batteries positioned therein. In some embodiments, the battery exchange station 207 can be implemented without the locking mechanism.

When a user inserts an exchangeable battery 201 (which includes a battery memory 213 configured to store various types of battery information) into an empty battery slot (e.g., slot 217c, as shown in FIG. 2) of the battery exchange station 207, connections are made to the battery memory 213, and the station 207 can start retrieving information (e.g., the type of vehicle that the inserted battery provided power to) from and storing information to (e.g., firmware packages or other suitable information to be provided) the battery memory 213. In some embodiments, the information to be stored can be stored in the station 207 (e.g., in a memory, a storage device, a hard disk, etc.). In some embodiments, the station 207 can receive information to be stored from a server (e.g., the server 103).

Figure 2B:
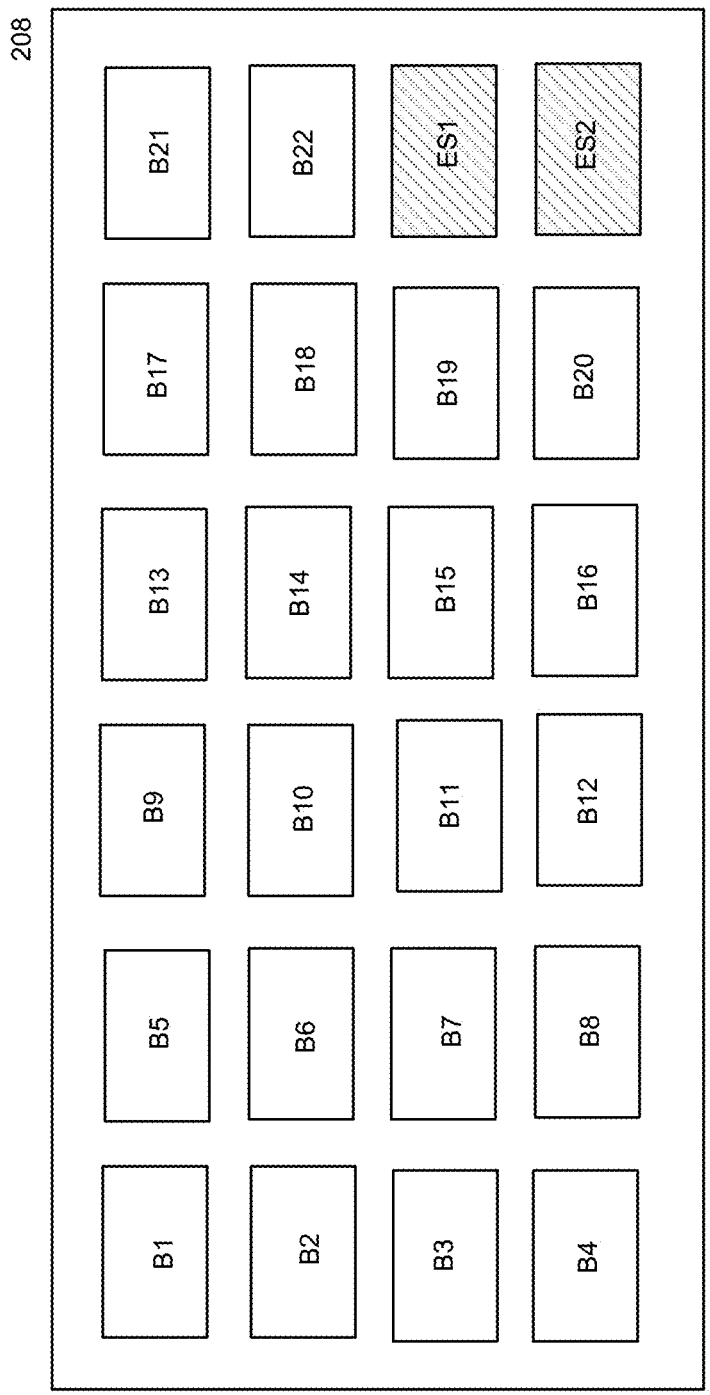
FIGS. 2B-2D are diagrams illustrating how to arrange multiple batteries in a battery exchange station in accordance with embodiments of the disclosed technology.

FIG. 2B is a diagram illustrating how to arrange multiple batteries in a battery exchange station in accordance with embodiments of the disclosed technology. A battery station 208 can have 22 batteries B1 to B22 that can be provided to a user at one time. The battery station 208 can also have two empty slots, ES1, ES2 for a user to insert depleted batteries. In some embodiments, the battery station 208 can be a modular station (e.g., batteries B1 to B8 are from a first module, batteries B9-B16 are from a second module, and batteries B17-B22 are from a third module).

The batteries B1-B22 can be prepared based on the ratio discussed above. For example, assume that B1-B22 are to be prepared based on a ratio "4:4:3," corresponding to information X, Y, and Z. Because whether a battery is ready for picking up is determined on its state of charge (SoC) (e.g., it depends on various factors such an initial SoC of the battery has when it is inserted in the station 208), the distance between two batteries to be provided (e.g., not too far for better user experiences) and other suitable factors (e.g., different types of batteries can have different memories attached thereto, which can have different sizes suitable; e.g., some update packages may be too large to be stored in certain type of memory), it is important for the battery station 208 to be flexible when preparing these batteries.

For example, in some embodiments, the station 208 can designate and prepare (1) batteries B1-B4 and B9-B12 as batteries with information X; (2) batteries B5-B8 and B17-B20 as batteries with information Y; and (3) batteries B13-B16, B21 and B22 as batteries with information Z. By this arrangement, batteries are in a "staggered" arrangement, such that a user can potentially receive two batteries with different information at two adjacent battery locations (e.g., the user usually only needs one type of information to update; this arrangement can increase flexibility and an overall distribution speed of the information). In other embodiments, batteries can be arranged in other suitable ways based on the current situation (e.g., the current SoCs of the batteries B1-B22), and the station 208 can determine how to prepare batteries B1-B22 accordingly.

Figure 2C:
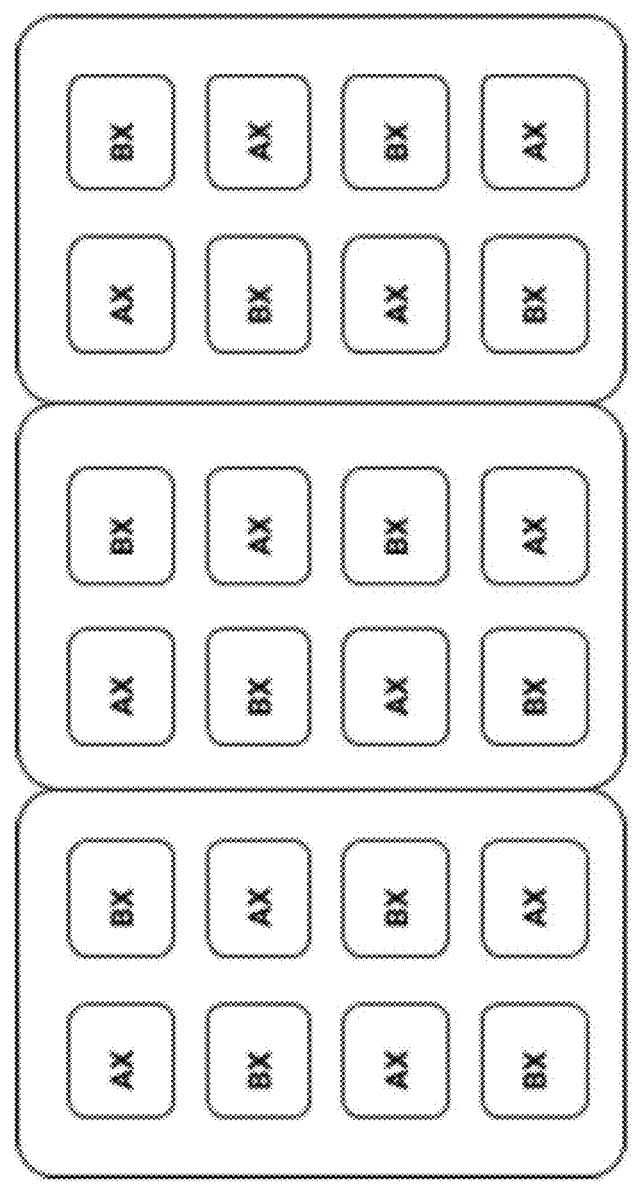
Figure 2D:
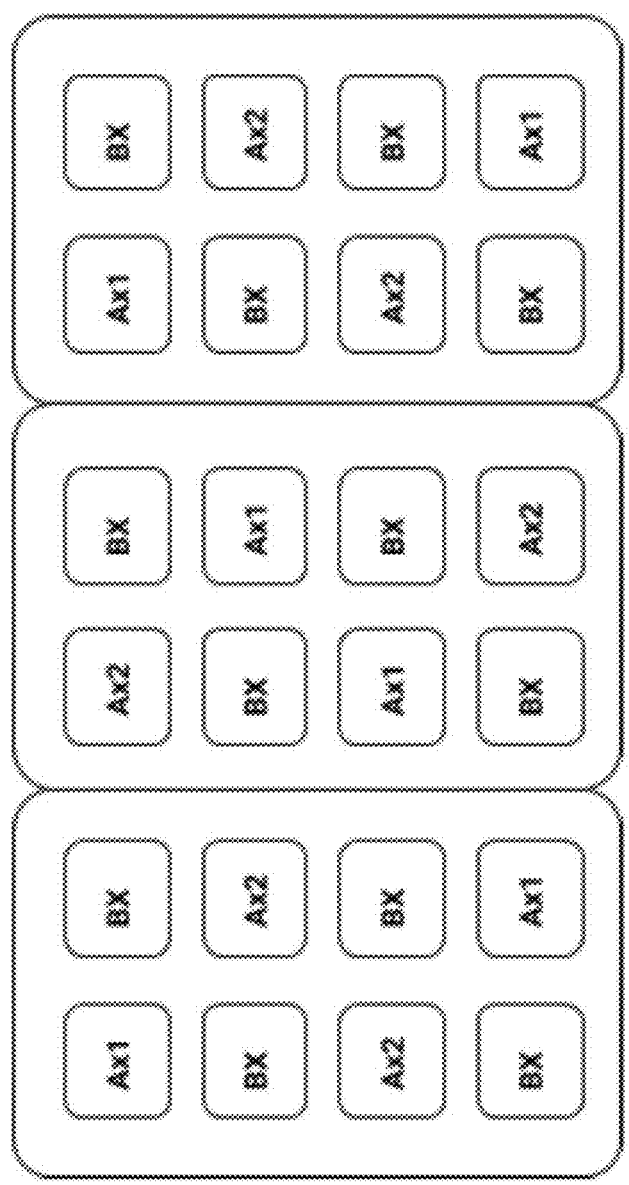

FIGS. 2C and 2D are diagrams illustrating embodiments of the "staggered" arrangement. As shown in FIG. 2C, the system can have two types of firmware packages to be provided, Ax and Bx. As shown in FIG. 2C, the batteries can be staggered such that two adjacent batteries have different firmware packages. In FIG. 2D, the system can have three types of firmware packages, Ax1 (e.g., version 1 of Ax), Ax2 (e.g., version 2 of Ax), and Bx. In this embodiment, the batteries having firmware packages Ax can be arranged basically the same as those described in FIG. 2C, and these batteries can be further staggered by version (e.g., adjacent two Ax batteries include one Ax1 battery and one Ax2 battery), as shown in FIG. 2D.

Figure 2E:
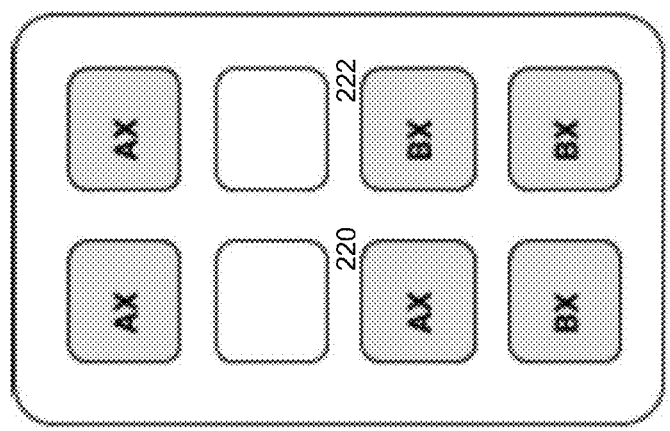
FIG. 2E is a diagram illustrating how to maintain a ratio of batteries in a station in accordance with embodiments of the disclosed technology.
Figure 2E:
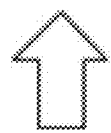
Figure 2E:
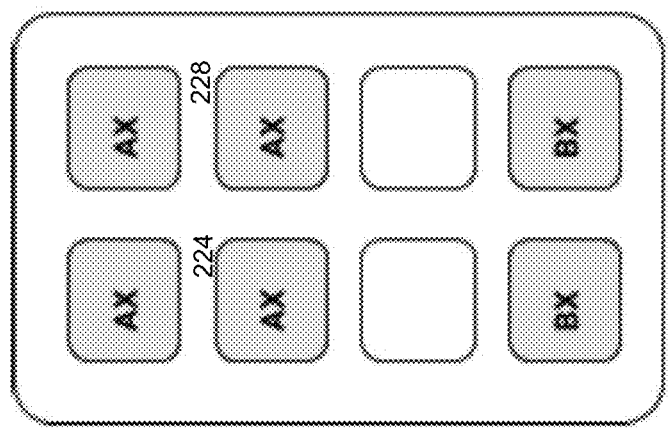

FIG. 2E is a diagram illustrating how to operate a station based on a ratio in accordance with embodiments of the disclosed technology. The station is operated to prepare batteries therein so as to quickly distribute vehicle-specific information (e.g., firmware packages) to various types of vehicles that the station serves. For example, assume that the station serves two types of vehicles, vehicle V1 and vehicle V2. The ratio of the numbers of vehicles V1 and V2 is "1:1." Firmware package Ax is to be provided to Vehicle V1, and firmware package Bx is to be provided to Vehicle V2. In this case, the station can prepare the batteries therein to let the ratio between the batteries having firmware package Ax and the batteries having firmware package Bx be equal to or at least proximate the ratio "1:1." When some of the batteries are exchanged by users, the current ratio of the batteries may no longer be "1:1."

In some embodiments, the station can be configured to maintain the current ratio of the batteries therein as close to an ideal ratio as possible, especially after each battery exchange process, such that the station is readily to serve all types of vehicles/users. From the foregoing example, the ideal ratio of "Ax: Bx" for the station is "1:1." Assume that the current ratio of "Ax:Bx" is "4:2," (e.g., the left portion of FIG. 2E) and a user inserts two batteries 220, 222 (e.g., the right portion of FIG. 2E). Also assume that battery 220 already has firmware package Ax and battery 222 already has firmware package Bx. To maintain the ideal ratio of "1:1," the station can let the user pick up existing batteries 224, 228 (both have firmware package Ax), if possible (e.g., they have been charged to exceed a threshold SoC, such as 90% SoC). In such embodiments, the station can locally (e.g., without a server input) and dynamically (e.g., in response to a battery insert) determine which battery to be picked up by users based on the ideal ratio that was previously determined.

Figure 3:
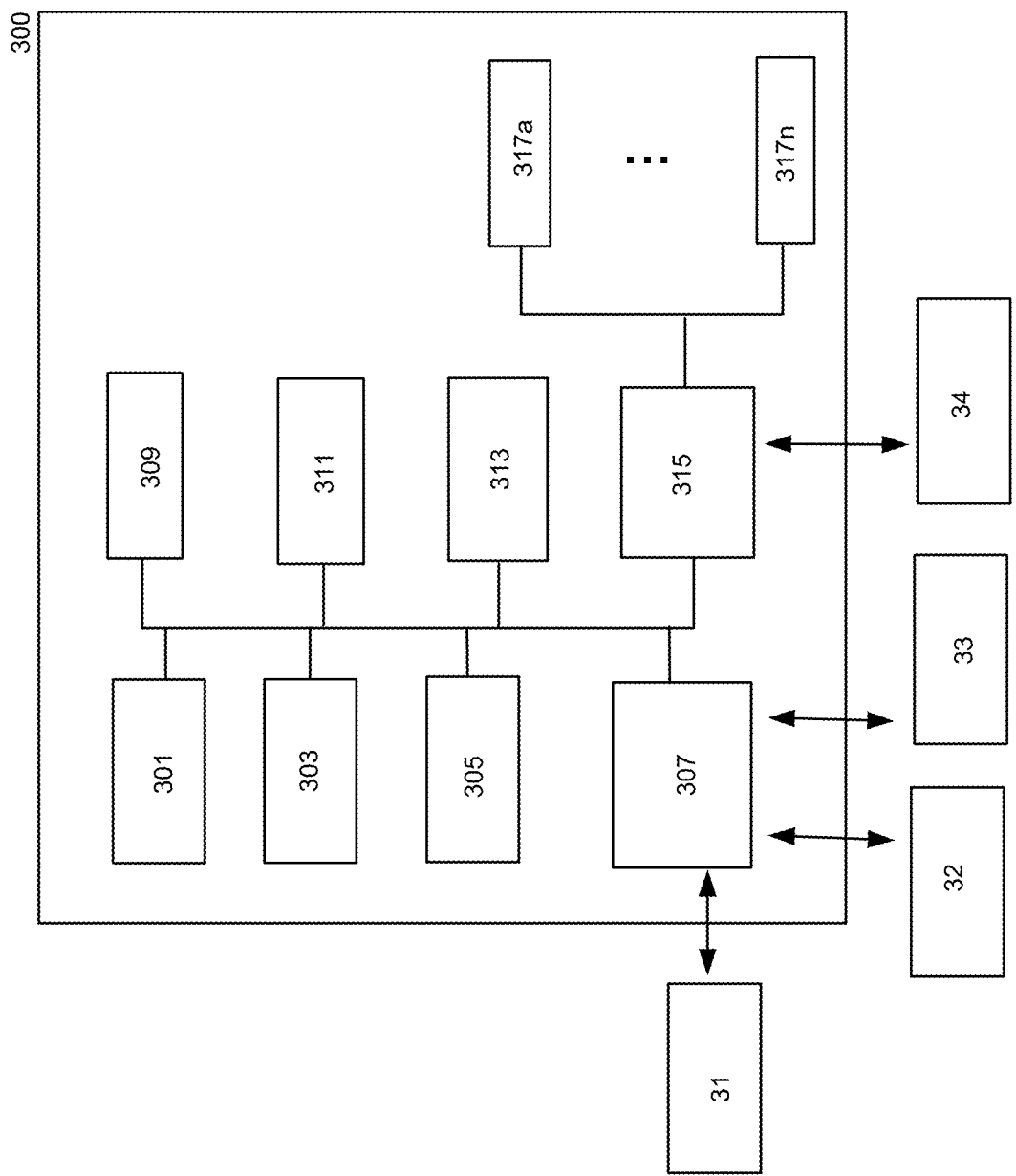
FIG. 3 is a diagram illustrating a station system in accordance with embodiments of the disclosed technology.

FIG. 3 is a schematic diagram illustrating a station system 300 in accordance with embodiments of the disclosed technology. As shown, the station system 300 includes a processor 301, a memory 303, a user interface 305, a communication component 307, a battery management component (or battery management system, BMS) 309, one or more sensors 311, a storage component 313, and a charging component 315 coupled to multiple battery slots 317a-n. The processor 301 is configured to interact with the memory 303 and other components (e.g., components 305-317) in the station system 300. The memory 303 is coupled to the processor 301 and is configured to store instructions for controlling other components or other information in the station system 300.

The user interface 305 is configured to interact with a user (e.g., receiving a user input and presenting information to the user). In some embodiments, the user interface 305 can be implemented as a touchscreen display. In other embodiments, the user interface 305 can include other suitable user interface devices. The storage component 313 is configured to store, temporarily or permanently, information, data, files, or signals associated with the station system 300 (e.g., information measured by the sensors 313, information collected from the batteries in the battery slots 317a-n, reference information, charging instructions, user information, etc.).

The communication component 307 is configured to communicate with other systems, such as a vehicle 31 (e.g., an electric vehicle that uses the exchangeable battery 201 as its power source), a mobile device 32 (e.g., user's smartphone that has an app configured to manage the vehicle 31), a server 33 (e.g., the server 103), other station stations, and/or other devices.

The battery management component 309 is configured to prepare the batteries based on the ratio as discussed above. More particularly, the battery management component 309 can detect the status (e.g., which firmware package is stored therein) of the batteries in the battery slots 317a-n and then store suitable information in the batteries (e.g., in the memories attached thereto) based on the ratio (and/or other factors to consider, as discussed above with reference to FIG. 2B).

In some embodiments, the battery management component 309 can manage the batteries positioned in the battery slots 317 based on instructions (e.g., store a specific firmware update package in a battery) from the server 33. In some embodiments, the battery management component 309 can periodically communicate with the server 33 to request update instructions. In some embodiments, the management component 309 can manage the current ratio of the batteries of the station system 300 (e.g., in the way described above with reference to FIG. 2E).

In some embodiments, the battery management component 309 can analyze information collected from a battery inserted in one of the battery slots 317 and compare the collected information with a reference information (e.g., a set of battery characteristics associated with multiple batteries). The battery management component 309 can accordingly generate a customized battery charging plan for the inserted battery based on the comparison. In some embodiments, the customized battery charging plan can be determined by the server 33.

The charging component 315 is configured to control a charging process for each of the batteries positioned in the battery slots 317a-n. The battery slots 317a-n are configured to accommodate and charge the batteries positioned and/or locked therein. The charging component 315 receives power from the power sources 34 and then uses the power to charge the batteries positioned in the battery slots 317a-n, based on predetermined customized charging plans, either received from the server 33 or stored in the storage system 300.

In some embodiments, the station system 300 can prepare batteries based on the ratio and a battery demand prediction generated by the server 33 (e.g., the battery demand prediction can be generated based on predicted user behavior, station characteristics, events close to a battery exchange station, etc.). For example, a battery demand prediction shows that, in the next hour, there will be more battery exchanges for vehicles 12a and less exchanges for vehicles 12b (see e.g., FIG. 1A). Accordingly, the station system 300 can adjust the ratio. In some embodiments, the server 33 can provide such battery demand prediction. In some embodiments, the server 33 can track the locations of the vehicles 31 and then accordingly adjust the ratio.

The sensors 311 are configured to measure information associated with the station system 300 (e.g., working temperature, environmental conditions, power connection, network connection, etc.). The sensors 311 can also be configured to monitor the batteries positioned in the battery slots 317a-n. The measured information can be sent to the battery management component 309 and/or the server 33 for further analysis. For example, the sensor 311 can detect whether a battery is functioning properly and provide feedback to the station system 300 to adjust accordingly (e.g., to maintain the ratio), if appropriate.

Figure 4:
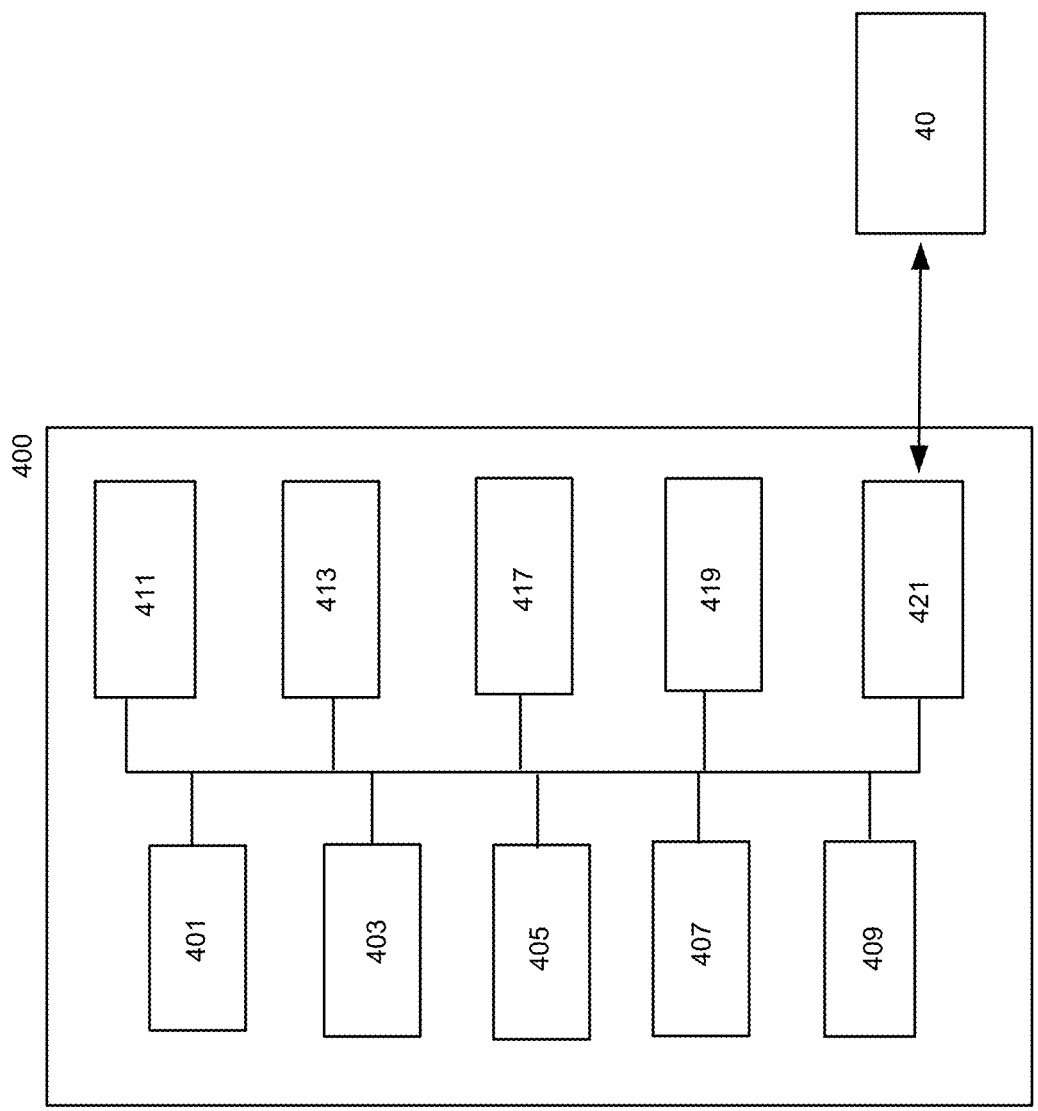
FIG. 4 is a diagram illustrating a server system in accordance with embodiments of the disclosed technology.

FIG. 4 is a schematic diagram illustrating a server system 400 in accordance with embodiments of the disclosed technology. The server system 400 is also configured to manage information associated with multiple batteries that can be deployed or managed by the server system 400. In some embodiments, the client station 40 can be implemented as the battery exchange station 107, 207, or 208 discussed above.

As shown in FIG. 4, one embodiment of a server system 400 includes a processor 401, a memory 403, input/output (I/O) devices 405, a storage component 407, a ratio analysis module 409, a power source analysis module 411, a station analysis module 413, a user behavior analysis module 417, a vehicle analysis module 419, and a communication component 421. The processor 401 is configured to interact with the memory 403 and other device/ modules/components (e.g., elements 405-421) in the server system 400.

The I/O devices 405 are configured to communicate with an operator (e.g., receive an input therefrom and/or present information thereto). In some embodiments, the I/O devices 405 can be one component (e.g., a touch screen display). In some embodiments, the I/O devices 405 can include an input device (e.g., keyboards, pointing devices, card reader, scanner, camera, etc.) and an output device (e.g., a display, network card, speaker, video card, audio card, printer, speakers, or other external device).

The storage component 407 is configured to store, temporarily or permanently, information, data, files, or signals associated with the server system 400 (e.g., collected information, reference information, information to be analyzed, analysis results, etc.). In some embodiments, the storage component 407 can be a hard disk drive, flash memory, or other suitable storage means. The communication component 421 is configured to communicate with other systems (e.g., the client station 40 or other stations) and other devices (e.g., a mobile device carried by a user, a vehicle, etc.).

The ratio analysis module 409 is configured to determine the ratio used to determine how to prepare batteries in the client station 40. The ratio can be determined based on information from the vehicle analysis module 419. For example, the information from the vehicle analysis module 419 can indicate a ratio of multiple types of vehicles that are operated in an area adjacent to the client station 40. In some embodiments, referring to FIG. 1A, the ratio analysis component 419 can monitor the statuses of the vehicles 12, 14 in Service Areas 1, 2, and then determine or adjust the ratio accordingly. For example, the ratio analysis module 419 can determine the ratio based on the numbers of the vehicles 12, 14 in Service Areas 1, 2. In some embodiments, the ratio analysis module 419 can determine or adjust the ratio based on the types of information to be provided (e.g., operational parameter sets for high-performance users and economic users). In some embodiments, the ratio analysis module 419 can determine or adjust the ratio based on an input from a system operator.

The power source analysis module 411 is configured to analyze the status (e.g., reliability, stability, continuity, etc.) of one or more power sources that are used to power the client station 40 for charging the batteries therein. For example, the power source analysis module 411 can determine that a power source used to supply power to the client station 40 will be interrupted during 1 a.m. to 3 a.m. on a particular date, and then the power source analysis module 411 can accordingly adjust an information-providing plan for the client station 40 (e.g., plan to store information to be provided in the batteries in the client station 40 based on the ratio).

The station analysis module 413 is configured to categorize the multiple battery stations into various types and identify representative characteristics/patterns for each type, such that the charging plan analysis module 409 can use such information as basis for its analysis. For example, the station analysis module 413 can analyze multiple stations and then determine that some of the analyzed stations can be considered in the same group (e.g., in the same area, such as Service Area 1 or Service Area 2 discussed above with reference to FIG. 1A). In some embodiments, for the stations that are considered in the same group, they can operate by using the same ratio (e.g., an average of the ratios of all stations in a group or a representative ratio from one of the stations in the group).

Similar to the station analysis component 413, the user behavior analysis component 417, and the vehicle analysis component 419 are also configured to categorize the user behavior and vehicles powered by the batteries, respectively, into various types and identify representative characteristics/patterns for each type. For example, the user behavior analysis component 417 can categorize the user behavior based on how they exchange and/or use the batteries. For example, a user may prefer having latest versions of firmware/software for his or her vehicle (e.g., a professional racer). As another example, a user may only use battery to power its vehicle for daily errands (e.g., picking up children or grocery shopping). Once a user reserves a battery at the client station 40, the client station 40 then provides information associated with the reservation to the server system 400. The server system 400 can then determine the type/category of the user who made the reservation and accordingly adjust the information-providing plan for the client station 40. In some embodiments, such adjustment can be made by the client station 40.

The vehicle analysis component 419 can categorize the types of vehicles that users are planning to operate. For each type of vehicle, the vehicle analysis component 419 can determine which information is to be provided. In some embodiments, vehicle type information can be found in the user profiles or account information. In other embodiments, the vehicle type information can be provided by the client station 40 to the server system 400. Using the information related to the vehicle types, the server system 400 can accordingly determine the ratio for the vehicles. For example, the vehicle analysis component 419 can determine that there are five types of vehicles (V1-V5) associated with the server system 400. The server system 400 can then determine that vehicles V1-V3 require firmware update package FA, and vehicles V4 and V5 require firmware update package FB. Based on the determination, the server system 400 can then calculate the ratio.

In some embodiments, the server system 400 can generate the information-providing plan for the client station 40 in a real-time or near real-time manner. In such embodiments, the server system 400 monitors the status of the client station 40. Once there is a change (e.g., a user just removed two fully-charged batteries and left two discharged/depleted ones at the client station 40) or a potential change (e.g., a user makes a reservation to exchange batteries at the client station 40) that may affect the charging process of the client station 40, the server system 400 can perform the analysis mentioned above and generate an updated information-providing plan for the client station 40 to follow. In some embodiments, the change or potential change can be transmitted to the server system 400 from a mobile device (e.g., a user uses an app installed thereon to make a battery reservation), another server (e.g., a web-service server associated with an app used by a user), and/or the client station 40.

Figure 5:
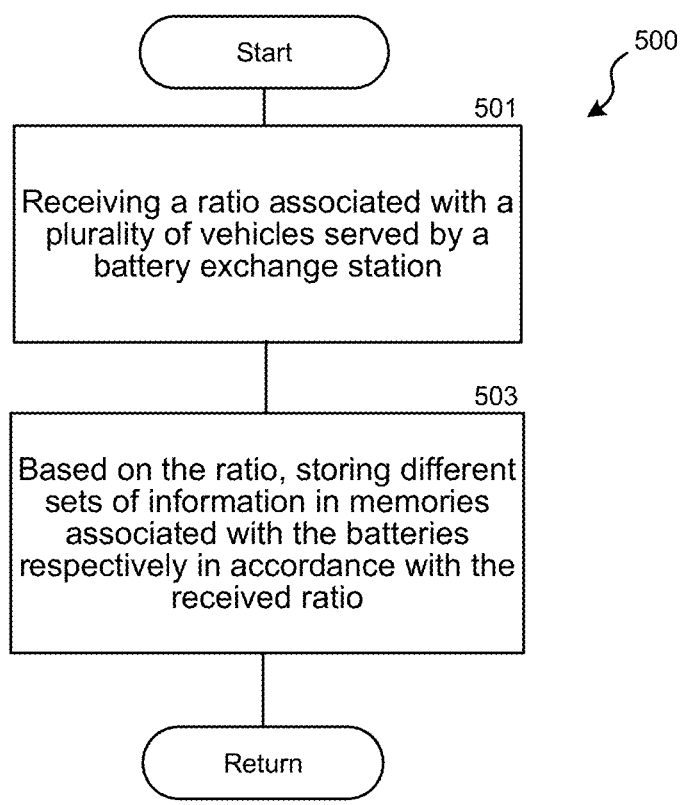
FIGS. 5, 6, and 7 are flowcharts illustrating methods (e.g., performed by a programed processor) in accordance with embodiments of the disclosed technology.

FIG. 5 illustrates a method 500 for operating a battery exchange station according to an information-providing plan (e.g., to provide various types of information to multiple vehicles served by the battery exchange station via the batteries in the battery exchange station). The method 500 starts at block 501 by receiving a ratio associated with the multiple vehicles served by the battery exchange station. At block 503, the method 500 then prepares the batteries in the battery exchange station based on the ratio by storing different sets of information in memories attached to the batteries respectively in accordance with the received ratio. In some embodiments, the method 500 can include receiving an updated ratio from a server and then updating the stored information accordingly.

In some embodiments, the plurality of vehicles served by the battery exchange station can be the vehicles that are generally operated in an area adjacent to the battery exchange station (e.g., within a 10-kilometer radius). In some embodiments, these vehicles can be determined based on information in user profiles (e.g., historical routes, addresses, etc.) or location information of these vehicles (e.g., global positioning system (GPS) signals). In some embodiments, the area can be a geographical area such as an area adjacent to a point of interest (a stadium, city hall, university, shopping mall, facility, etc.), a recreational area, etc. In some embodiments, the area can be an administrative area such as a city, a county, district, etc. In some embodiments, there can be multiple battery exchange stations in the area, and two or more (or all) of these stations can be operated by using one or more steps of the method 500.

In some embodiments, the ratio can be determined based on the numbers of different types of vehicles. For example, there can be a first number of a first type of vehicles and a second number of a second type of vehicles. In such embodiments, the ratio can be "the first number versus the second number."

In some embodiments, the method 500 includes receiving an updated ratio from a server. In some embodiments, the method 500 includes updating the ratio (e.g., by the battery exchange station) based on information from a server (e.g., updated numbers of different types of vehicles).

In some embodiments, the information from the server can include a change associated with the plurality of vehicles. For example, the information can include a change of the vehicle numbers in the area (e.g., 100 type-A vehicles move to the area, and 200 type-B vehicles leave the area; accordingly, the ratio between type-A and type-B vehicles can change).

In some embodiments, the information from the server can include a change associated with the different sets of information to be stored. For example, the change can include the release of a new firmware. In some embodiments, the change can include the release of a new-version firmware.

In some embodiments, the method 500 can include storing information in adjacent batteries such that adjacent batteries have different sets of information, as described above with reference to FIGS. 2B-2E.

Figure 6:
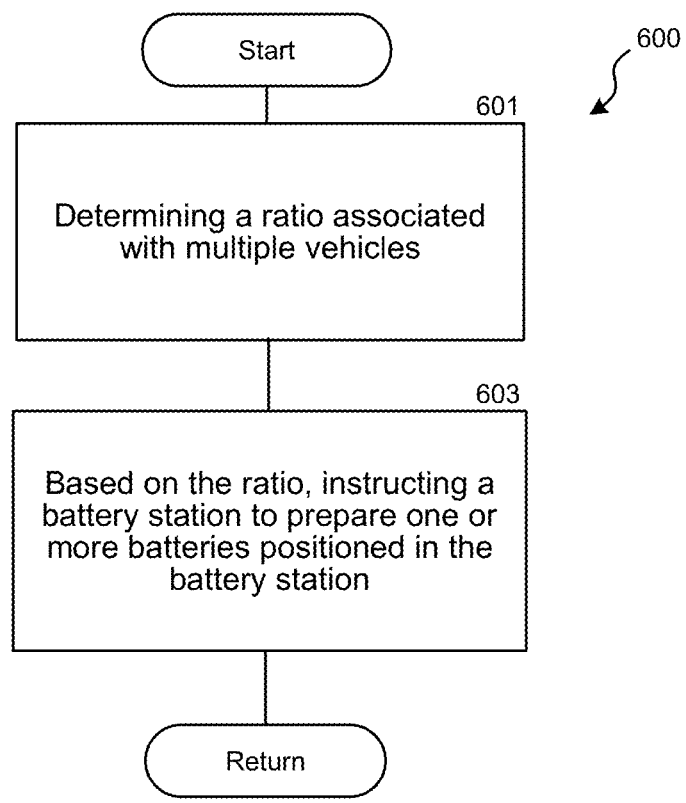

FIG. 6 illustrates a method 600 for providing firmware (or updating the same) to multiple vehicles operated in an area. In some embodiments, the method 600 can be implemented by a server (e.g., the server 103, 33 or the server system 400). The method 600 includes, (1) determining a ratio associated with the multiple vehicles (block 601); and (2) based on the ratio, instructing a battery station to prepare one or more batteries positioned in the battery station (block 603). In some embodiments, the method 600 can further include (1) determining the ratio based on numbers of types of the multiple vehicles; and (2) determining the ratio based on types of information to be provided. In some embodiments, the method 600 can further include (1) generating multiple sets of update packages based on the determined types of vehicles; and (2) based on the ratio, storing, respectively, the multiple sets of information in individual memories attached to the batteries positioned in the battery station.

In some embodiments, the method 600 can include (1) determining a ratio associated a plurality of vehicles generally operated in an area; (2) identifying at least one of the one or more battery exchange stations that serves the plurality of vehicles generally operated in the area; and (3) instructing the at least one battery exchange station to store, respectively, different sets of information in memories associated with plurality of batteries positioned in the at least one battery exchange station in accordance with the ratio. In some embodiments, the plurality of vehicles can include a first number of a first type of vehicles and a second number of a second type of vehicles. The ratio can be determined at least partially based on the first number and the second number.

In some embodiments, the different sets of information can include multiple types of firmware, multiple versions of firmware, and/or other suitable information. In some embodiment, the method 600 can include instructing the at least one battery exchange station to store different sets of information in adjacent batteries, as described above with reference to FIGS. 2B-2E.

Figure 7:
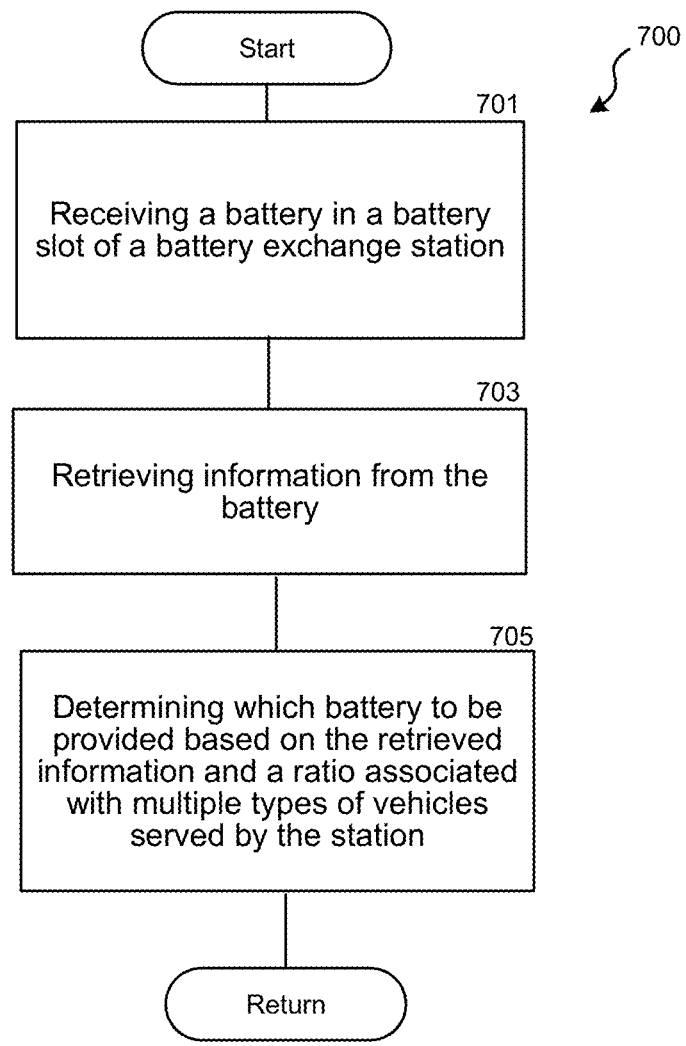

FIG. 7 illustrates a method 700 for operating a battery exchange station. At block 701, the method 700 includes receiving a battery in a battery slot of the battery exchange station. The method 700 further includes, at block 703, retrieving information from the battery. In some embodiments, the retrieved information includes which type of vehicle the battery has been provided power to. At block 705, the method 700 includes, at block 705 determining which battery to be provided based on the retrieved information and a ratio associated with multiple types of vehicles served by the station. In some embodiments, the retrieved information can be sent to a server. The server can then update the ratio for other battery stations based on the retrieved information.

Although the present technology has been described with reference to specific exemplary embodiments, it will be recognized that the present technology is not limited to the embodiments described but can be practiced with modifications and alterations within the spirit and scope of the appended claims. Accordingly, the specification and drawings are to be regarded in an illustrative sense rather than a restrictive sense.

The invention claimed is:

1. A method for operating a battery exchange station to store information in a plurality of batteries being positioned in the battery exchange station, the method comprising:
    determining, at a server, a ratio associated with a plurality of vehicles served by the battery exchange station, wherein the ratio is determined by a processor of the server based on two or more types of the plurality of vehicles;
    identifying, at the battery exchange station, at least first set and second set of batteries of the plurality of batteries, wherein a first number of the first set batteries and a second number of the second set batteries are determined based on the ratio; and
    storing, at the battery exchange station, respective firmware updates for the two or more types of the plurality of vehicles in memories located onboard the first set of batteries and the second set of batteries, wherein the respective firmware updates are stored based on the ratio.

2. The method of claim 1, further comprising:
    determining the ratio at least partially based on a first number of first vehicles of the plurality of vehicles served by the battery exchange station and a second number of second vehicles of the plurality of vehicles served by the battery exchange station.

3. The method of claim 1, further comprising:
    determining the ratio at least partially based on a first number of first vehicles of the plurality of vehicles served by the battery exchange station, a second number of second vehicles of the plurality of vehicles served by the battery exchange station, and a third number of different sets of information in the memories associated with the plurality of batteries.

4. The method of claim 1, further comprising receiving an instruction, from the server, to store two different sets of information in the memories associated with two adjacent batteries of the plurality of batteries.

5. The method of claim 4, wherein the information from the server includes a change associated with the plurality of vehicles.

6. The method of claim 4, wherein the information from the server includes a change associated with the different sets of information to be stored.

7. A method for providing information to one or more battery exchange stations, the method comprising:
    determining, at a server, a ratio associated a plurality of vehicles generally operated in an area, wherein the ratio is determined by a processor of the server based on two or more types of the plurality of vehicles;
    identifying, at a battery exchange station, at least one of the one or more battery exchange stations that serves the plurality of vehicles generally operated in the area, wherein a first number of the first set batteries and a second number of the second set batteries are determined based on the ratio; and
    instructing the at least one battery exchange station to store respective firmware updates for the two or more types of the plurality of vehicles in memories located onboard the first set of batteries and the second set of batteries, wherein the respective firmware updates are stored based on the ratio.

8. The method of claim 7, wherein the plurality of vehicles include a first number of a first type of vehicles and a second number of a second type of vehicles, and wherein the ratio is determined based on the first number and the second number.

9. The method of claim 7, wherein the respective firmware updates include multiple types of firmware.

10. The method of claim 7, wherein the respective firmware updates include multiple versions of firmware.

11. A battery exchange station, comprising:
    a processor;
    multiple battery slots configured to charge batteries positioned in the battery slots; and
    multiple connectors respectively positioned in the multiple battery slots and configured to respectively communicate with battery processors connected with multiple memories associated with the batteries;
    wherein the processor is configured to—
        receive a ratio associated with a plurality of vehicles served by the battery exchange station, wherein the ratio is determined by a server based on two or more types of a plurality of vehicles; based on the ratio, identify at least first set and second set of batteries of the plurality of batteries;
        store a first set of information in memories of the first set of batteries;
        store a second set of information in memories of the second set of batteries; and
        store different sets of information in the multiple memories associated with the batteries respectively in accordance with the ratio.

12. The battery exchange station of claim 11, wherein:
    the ratio is received from a server.

13. The battery exchange station of claim 11, wherein the processor is configured to:
    based on the ratio, identify at least a third set of batteries of the plurality of batteries;
    storing a third set of information in memories of the third set of batteries, wherein the third set of information is different from the first and second sets of information.

14. The battery exchange station of claim 11, wherein a plurality of vehicles served by the battery exchange station are generally operated in a geographical area adjacent to the battery exchange station.

15. The battery exchange station of claim 11, wherein a plurality of vehicles served by the battery exchange station are generally operated in an administrative area adjacent to the battery exchange station.

16. The battery exchange station of claim 11, wherein the processor is configured to receive an updated ratio from a server and updating the ratio based on the updated ratio.

17. The battery exchange station of claim 11, wherein the first and second sets of information include multiple types of firmware.

18. A battery exchange station, comprising:
a processor;
multiple battery slots configured to charge batteries positioned in the battery slots; and
multiple connectors respectively positioned in the multiple battery slots and configured to respectively communicate with battery processors connected with multiple memories associated with the batteries;
wherein the processor is configured to—
receive a ratio associated with a plurality of vehicles served by the battery exchange station, wherein the ratio is determined by a server based on two or more types of a plurality of vehicles; based on the ratio, identify at least first set and second set of batteries of the plurality of batteries;
store a first set of information in memories of the first set of batteries;
store a second set of information in memories of the second set of batteries; and
store different sets of information in the multiple memories associated with the batteries respectively in accordance with the ratio, wherein the plurality of vehicles include a first number of first type of vehicles and a second number of second type of vehicles, and wherein the ratio is determined at least partially based on the first number and the second number.

19. A battery exchange station, comprising:
a processor;
multiple battery slots configured to charge batteries positioned in the battery slots; and
multiple connectors respectively positioned in the multiple battery slots and configured to respectively communicate with battery processors connected with multiple memories associated with the batteries;
wherein the processor is configured to—
receive a ratio associated with a plurality of vehicles served by the battery exchange station, wherein the ratio is determined by a server based on two or more types of a plurality of vehicles; based on the ratio, identify at least first set and second set of batteries of the plurality of batteries;
store a first set of information in memories of the first set of batteries;
store a second set of information in memories of the second set of batteries; and
store different sets of information in the multiple memories associated with the batteries respectively in accordance with the ratio, wherein the first and second sets of information include multiple versions of firmware.

* * * * *